(12) United States Patent
Walton

(10) Patent No.: US 7,557,699 B2
(45) Date of Patent: Jul. 7, 2009

(54) INDICATOR LIGHT SYSTEM FOR TOWED OBJECTS

(76) Inventor: Douglas H. Walton, 12692 Fry Rd. NE., Aurora, OR (US) 97002

( * ) Notice: Subject to any disclaimer, the term of this patent is extended or adjusted under 35 U.S.C. 154(b) by 391 days.

(21) Appl. No.: 11/604,089

(22) Filed: Nov. 22, 2006

(65) Prior Publication Data

US 2007/0120654 A1     May 31, 2007

Related U.S. Application Data

(60) Provisional application No. 60/739,151, filed on Nov. 22, 2005.

(51) Int. Cl.
  *B60Q 1/52* (2006.01)
  *B60Q 7/02* (2006.01)
(52) U.S. Cl. .............. 340/472; 340/463; 340/479
(58) Field of Classification Search ........... 340/463, 340/472, 479; 280/493
  See application file for complete search history.

(56) References Cited

U.S. PATENT DOCUMENTS

| | | | |
|---|---|---|---|
| 4,859,982 A | 8/1989 | Seaburg | |
| 5,195,813 A | 3/1993 | Brown | |
| 5,424,715 A | 6/1995 | Lietzow | |
| 5,442,332 A | 8/1995 | Hughes | |
| 5,666,103 A | 9/1997 | Davis, Jr. | |
| 6,100,801 A * | 8/2000 | Plummer | 340/479 |
| 6,177,867 B1 | 1/2001 | Simon et al. | |
| 6,677,856 B2 | 1/2004 | Perlman et al. | |
| 6,933,839 B2 | 8/2005 | Henry | |
| 7,199,705 B1 * | 4/2007 | Mixon | 340/472 |

* cited by examiner

*Primary Examiner*—George A Bugg
*Assistant Examiner*—Samuel J Walk
(74) *Attorney, Agent, or Firm*—Kolisch Hartwell, P.C.

(57) ABSTRACT

An indicator light assembly is provided for use with a towed object having a substantially planar rear end, at least one substantially planar side orthogonal to the end, and an intersection between the side and the end. The indicator light assembly includes a transmitting assembly and at least one tail-light assembly. The transmitting assembly transmits wireless signals corresponding to vehicular indicator light signals when coupled to an indicator light energizing circuit of the vehicle. The tail-light assembly includes a support structure, as well as an indicator light, a receiver, and a controller attached to the support structure. The support structure includes a first planar portion and a second planar portion orthogonal to the first portion, where at least one of the first and second portions includes a plurality of apertures for receiving fasteners. The receiver receives the wireless signals. The controller processes the received wireless signals, and energizes the indicator light in a manner corresponding to the vehicular indicator light signal. The support structure is adapted to be mounted on the intersection in a mounted position, whereby the first portion engages the side, the second portion engages the end, and the indicator light is appropriately positioned for viewing from a selected position spaced from the rear end. The support structure is adapted to be secured in the mounted position by inserting the fasteners through the apertures and into the towed object.

20 Claims, 4 Drawing Sheets

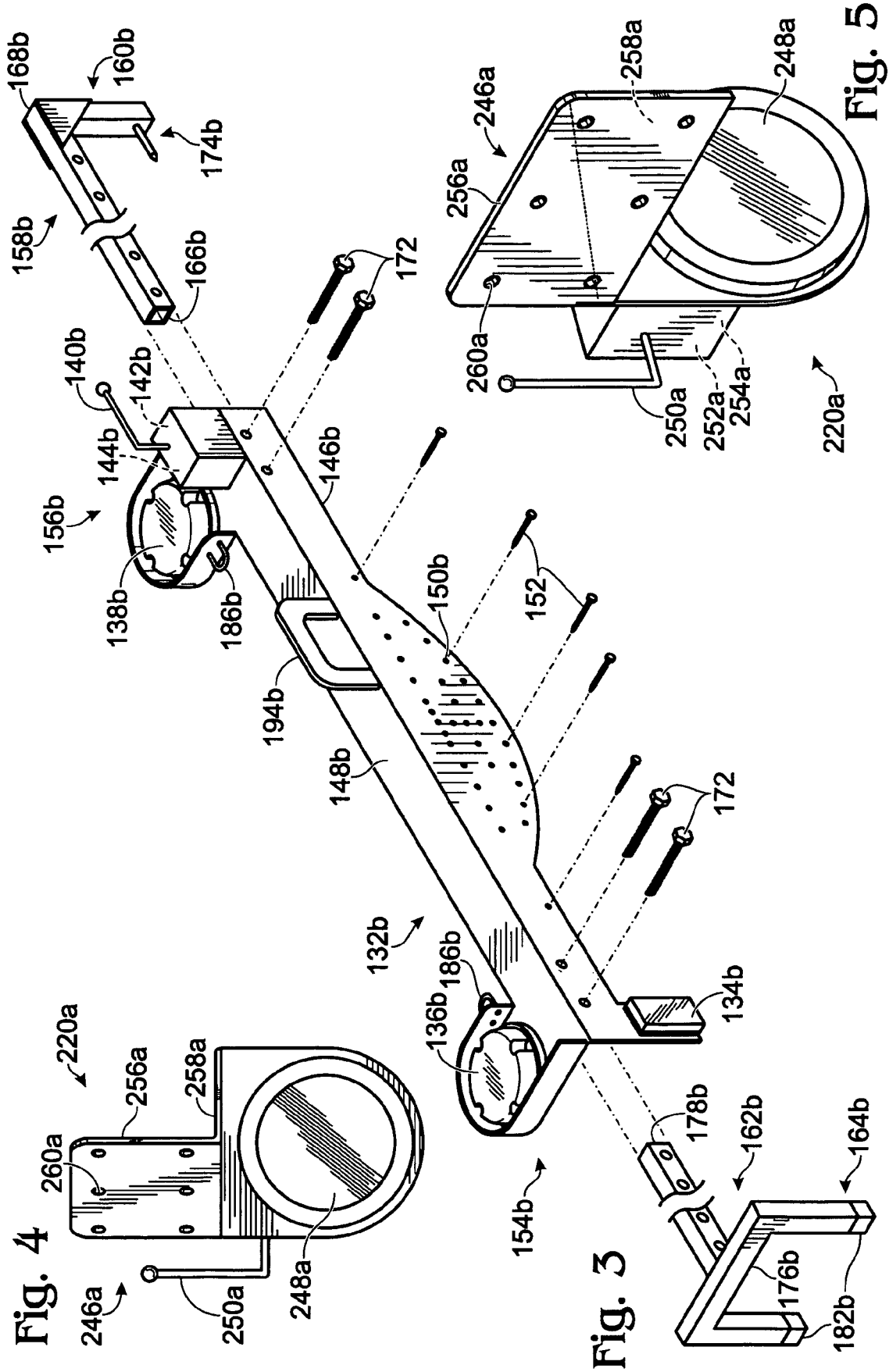

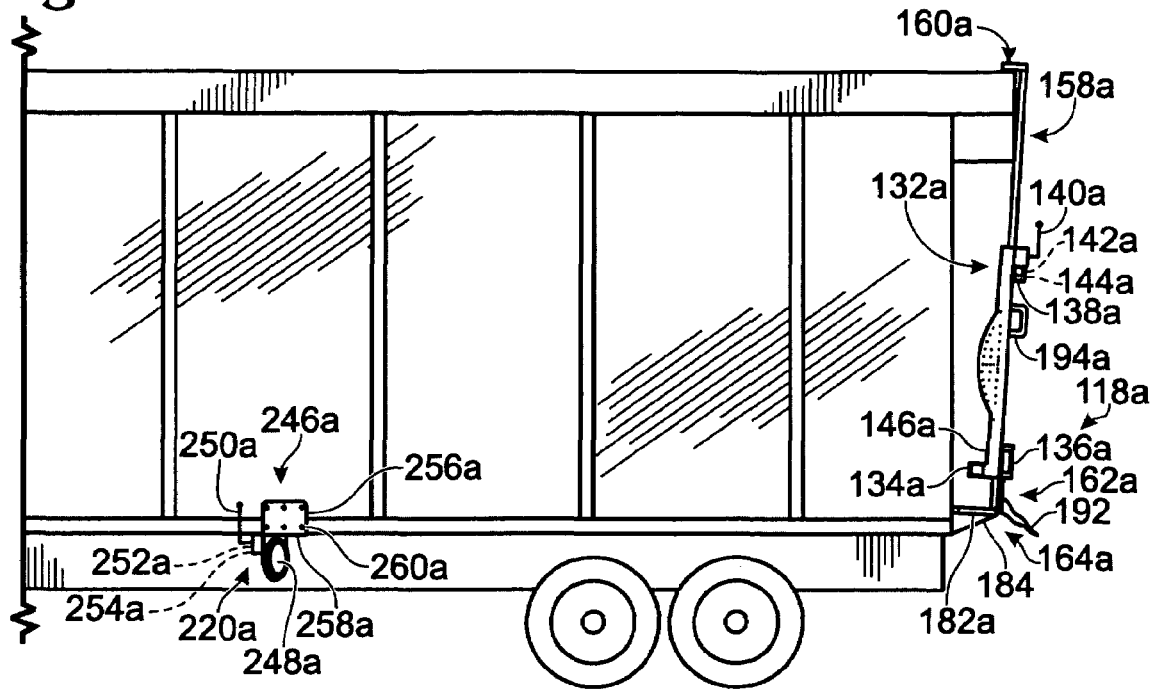
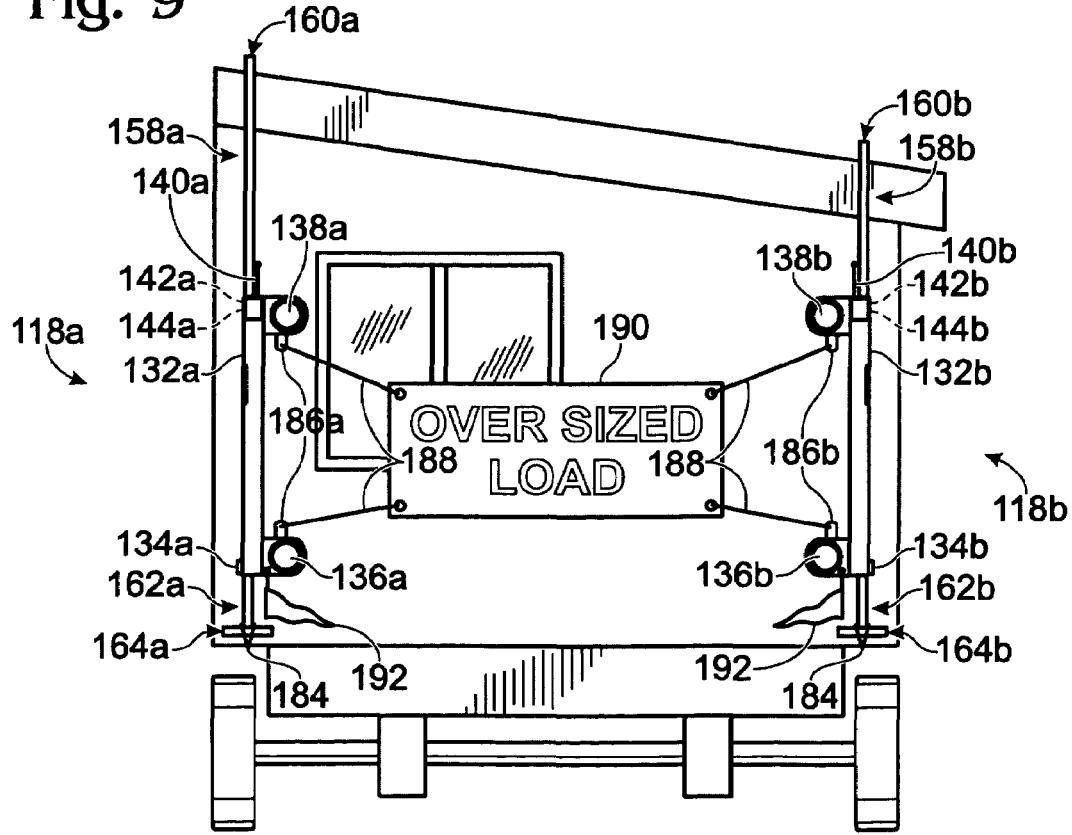

INDICATOR LIGHT SYSTEM FOR TOWED OBJECTS

CROSS-REFERENCE TO RELATED APPLICATION

This application claims priority under 35 U.S.C. § 119(e) to U.S. Provisional Patent Application Ser. No. 60/739,151 entitled "Indicator Light System for Towed Objects," filed Nov. 22, 2005, the complete disclosure of which is herein incorporated by reference for all purposes.

BACKGROUND AND SUMMARY OF THE INVENTION

Indicator lights, such as turn-signal lights, running lights, brake lights, and/or amber lights, provide an essential safety system for motor vehicles, because they indicate the operating condition of a vehicle, and warn others about upcoming stops and turns. Hazards can occur when a vehicle is towing an object, such as a trailer with or without a load, a second vehicle, or a mobile home, because the towed object tends to obscure the tail-lights of the towing vehicle. In such situations, prudence and traffic laws require that the towed object also be provided with adequate indicator lights to ensure the safety of those using the roadways.

Toward this end, many towed objects are independently equipped with indicator light systems that include a jack or similar connector adapted to interface with a vehicle's indicator light energizing circuitry, whereby the towed object's indicator lights are energized synchronously with the indicator lights of the towing vehicle. However, these types of lighting systems may be inadequate for many towed objects. For example, "oversized loads," such as mobile homes, large machinery, and the like, not only obscure the indicator lights of the towing vehicle, but also of the towed trailer upon which they are secured. Because these objects also obscure the range of vision of the operator of the towing vehicle, it is essential that these objects be provided with an independent indicator light system that ensures that other drivers will see the necessary indicator lights from both the rear and the side of the towed object.

Operators of vehicles that tow large objects often must provide their own custom-made indicator light systems for use with the towed object. For example, mobile home movers must spend large amounts of time and effort creating custom-made indicator light systems that attach to the rear of the mobile home. Often it is difficult to ensure that these lighting systems comply with traffic laws, and/or are sufficiently safe for use on the roadways. Further, these custom-made indicator light systems must be attached to the rear of the object, and wired to the electrical system of the towing vehicle, which requires yet additional and substantial time and effort.

Therefore, the present application discloses indicator light assemblies that comply with applicable traffic laws, ensure that other drivers will see the necessary indicator lights from both the rear and the side of a large towed object, and are easy to install and use. The indicator light assemblies disclosed herein may each include a transmitting assembly, at least one tail-light assembly, and/or at least one side-light assembly. Examples of other indicator light systems may be found in U.S. Pat. Nos. 4,859,982; 5,195,813; 5,424,715; 5,442,332; 5,666,103; 6,100,810; 6,177,867; 6,677,856; and 6,933,839, the entire disclosures of which are herein incorporated by reference for all purposes.

BRIEF DESCRIPTION OF THE DRAWINGS

FIG. 3 shows an exploded isometric view of another exemplary tail-light assembly from the indicator light assembly of FIG. 1.

FIG. 4 shows a profile view of an exemplary side-light assembly from the indicator light assembly of FIG. 1.

FIG. 5 shows an isometric view of the side-light assembly from FIG. 4

FIG. 8 shows a side view of a towed object and towing vehicle with an exemplary indicator light assembly attached thereto, in accordance with the present disclosure.

FIG. 9 shows a rear view of a towed object with the indicator light assembly of FIG. 8 attached thereto, in accordance with the present disclosure.

DETAILED DESCRIPTION

Figure 1:
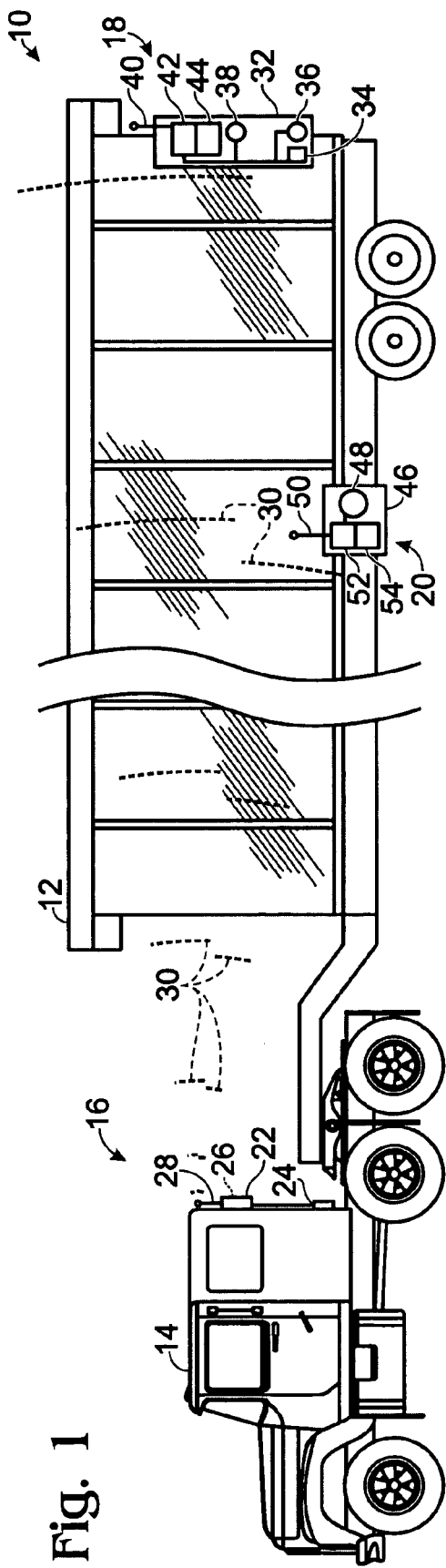
FIG. 1 generally shows a partial block diagram of an indicator light assembly for use with an object being towed by a towing vehicle.

FIG. 1 generally shows a block diagram of an indicator light system 10 attached to an object 12 being towed by a towing vehicle 14. The indicator light system may include a transmitting assembly 16, at least one tail-light assembly 18, and/or at least one side-light assembly 20. The transmitting assembly may comprise any component adapted to transmit at least one wireless signal that corresponds to a vehicular indicator light signal when coupled to an indicator light energizing circuit of the vehicle. A tail-light assembly may comprise any component that includes at least one indicator light, and that is adapted to (1) attach to the rear of a towed object, and (2) energize the indicator light(s) in a manner corresponding to the vehicular indicator light signal. A side-light assembly may comprise any component that includes a side turn-signal light, and that is adapted to (1) attach to the side of a towed object, and (2) energize the side turn-signal light in a manner corresponding to the vehicular indicator light signal.

A. The Transmitting Assembly

FIG. 1 shows aspects of the transmitting assembly 16 of the indicator light assembly 10. As indicated above, the transmitting assembly 16 may comprise any component adapted to transmit at least one wireless signal corresponding to a vehicular indicator light signal when coupled to an indicator light energizing circuit of a towing vehicle 14. The transmitting assembly may include one or more components, and have any suitable size and shape consistent with its function.

Figure 2:
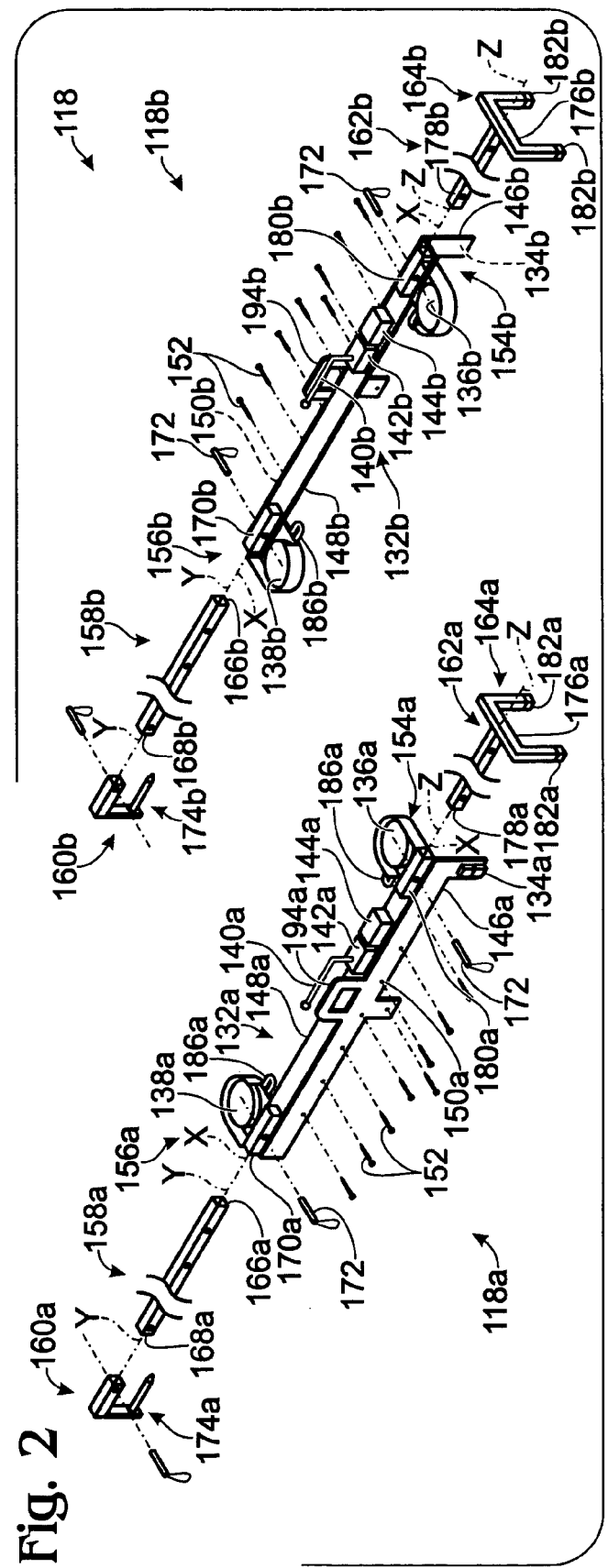
FIG. 2 shows an exploded isometric view of an exemplary tail-light assembly from the indicator light assembly of FIG. 1.

As best shown in FIG. 2, the transmitting assembly 16 may include a housing 22, a connector 24, a controller 26, and a transmitter 28. The housing may include at least one securing mechanism (not shown) for securing the transmitting assembly to a portion of the towed object 12 or the towing vehicle 14

(e.g. a magnet, a latch, fasteners and apertures for receiving the fasteners, a clamp, and/or any other suitable securing mechanism).

The connector 24 may be adapted to couple the controller 26 to the indicator light energizing circuit and/or the power supply of the towing vehicle 14. For example, the connector may include a jack or other coupler adapted to be selectively coupled to a corresponding jack or other coupler associated with the indicator light circuit and/or power supply of the towing vehicle. A vehicular indicator light signal generated by the vehicular indicator light circuit, such as an amber light signal (i.e. a strobe), a brake light signal, a left turn-signal light signal, a right turn-signal light signal, a running light signal, a hazard light signal, or any other vehicular indicator light signal, thus may be directly transmitted to the controller of the transmitting assembly through the connector. Power also may be supplied to the controller of the transmitting assembly from the power supply of the towing vehicle through the connector.

The controller 26 may be coupled to or housed within the housing, and may be adapted to process the received vehicular indicator light signal and to generate at least one corresponding wireless signal 30 that is transmitted by the transmitter 28.

The transmitting assembly 16 may additionally or alternatively include a power supply (not shown), independent of the power supply of the towing vehicle, adapted to supply power to the controller of the transmitting assembly. The independent power supply may include a non-rechargeable battery and/or a rechargeable battery (e.g. a metal halide battery, a Nickel-Cadmium battery, or any other type of rechargeable battery) that may be coupled to any recharging power source, such as a 12 Volt power source.

FIG. 1 shows the at least one wireless signal 30 being transmitted by the transmitter 28. The wireless signal may include any suitable signal for transmitting information corresponding to the information contained in the vehicular indicator light signals. For example, the wireless signal may include an R/F signal, an infrared signal, a microwave signal, or any other suitable signal, containing information corresponding to an amber light signal (i.e. a strobe), a brake light signal, a left turn-signal light signal, a right turn-signal light signal, a running light signal, a hazard light signal, or any other vehicular indicator light signal. For example, the controller may be adapted to use On/Off keying, or frequency modulation, to transmit R/F signals via the transmitter containing information, such as a code, that varies according to the particular vehicular indicator light signal received by the controller. Alternatively or additionally, the controller may be adapted to use pulses or bursts of infrared and/or microwave signals via the transmitter containing information that varies according to the particular indicator light signal received by the controller.

The wireless signal 30 transmitted by the transmitter 28 also may include addressing information that ensures that only a tail-light and/or a side-light assembly associated with a given indicator light assembly respond to the wireless signals. For example, the wireless signals may include one or more codes that must be received by the tail-light and/or side-light assembly in order for the tail-light or side-light assembly to respond to the wireless signal. The addressing information may prevent the tail-light and/or side-light assembly from responding to wireless signals transmitted by other indicator light assemblies or by sources of other interfering wireless signals (i.e. random interference).

B. The Tail-light Assembly

FIG. 1 shows various aspects of the at least one tail-light assembly 18 of the indicator light system 10. As discussed above, a wireless tail-light assembly may comprise any component that includes at least one indicator light, and that is adapted to (1) attach to the rear of a towed object, and (2) energize the indicator light(s) in a manner corresponding to the vehicular indicator light signal. The at least one tail-light assembly may include one or more components, and have any suitable size and shape consistent with its function.

The at least one tail-light assembly 18 may include a support structure 32, at least one indicator light (such as indicator lights 34, 36, and/or 38), a receiver 40, a controller 42, and/or a power supply 44. The support structure 32 may be adapted for mounting proximal to a rear end of the towed object 12 in at least one mounted position. The support structure also may be selectively attachable to one or more other components adapted to mount the support structure proximal to the rear of the towed object. Finally, the support structure may include a handle for easily carrying the assembly when it is detached from a towed object. These structural features will be discussed in more detail below with respect to specific exemplary embodiments of the tail-light assembly.

The at least one indicator light (such as indicator lights 34, 36, and/or 38) may be attached to the support structure 32 such that the at least one indicator light is appropriately positioned for viewing from a selected position spaced from a rear end of the towed object when the support structure is mounted in the at least one mounted position. For example, the selected position may be directly behind the rear end of the towed object at various intervals, or may be offset to the left or right of a position directly behind the rear end of the towed object. The at least one indicator light may include an amber light (i.e. a strobe), a brake light, a left turn-signal light, a right turn-signal light, a running light, and/or a hazard light. Some indicator lights may perform multiple functions. For example, left and right turn-signal lights may also function as brake lights, hazard lights and/or running lights. Some indicator lights may have a dedicated function. For example, amber lights may only function as a strobe for tail-light assemblies adapted for use with larger towed objects (i.e. wide loads).

The receiver 40 may be attached to the support structure 32, and may be adapted to receive the at least one wireless signal transmitted by the transmitter 28.

The controller 42 may be attached to the support structure 32 and may be coupled to the receiver 40. The controller also may be adapted to process the signals received by the receiver, and to thereafter energize the at least one indicator light (such as indicator light 34, 36 and/or 38) in a manner corresponding to the vehicular indicator light signal. Consequently, the at least one indicator light of each tail-light assembly may energize in a manner synchronized with the energization of the indicator lights of the towing vehicle 14. Some controllers may be adapted to disregard wireless signals received by the receiver that do not include proper addressing information. For example, the controller may be adapted to energize the at least one indicator light only upon receiving a code associated with a wireless signal transmitted by the transmitter.

The power supply 44 may be coupled to the controller 42, and may be adapted to provide power thereto. The power supply may include a non-rechargeable battery and/or a rechargeable battery (e.g. a metal halide battery, a Nickel-Cadmium battery, or any other type of rechargeable battery) that may be coupled to any recharging power source, such as a 12 Volt power source.

FIG. 2 shows an exemplary tail-light assembly 118 for use with towed objects of various dimensions. The tail-light assembly may include a left tail-light assembly 118a and a right tail-light assembly 118b. The left tail-light assembly may include a left support structure 132a, at least one indicator light (such as indicator lights 134a, 136a, and 138a), a receiver 140a, a controller 142a, and/or a power supply 144a. Similarly, the right tail-light assembly may include a right support structure 132b, at least one indicator light (such as indicator lights 134b, 136b, and 138b), a receiver 140b, a controller 142b, and/or a power supply 144b. Except as indicated below, these components may function in substantially the same manner as generally described above.

Figure 6:
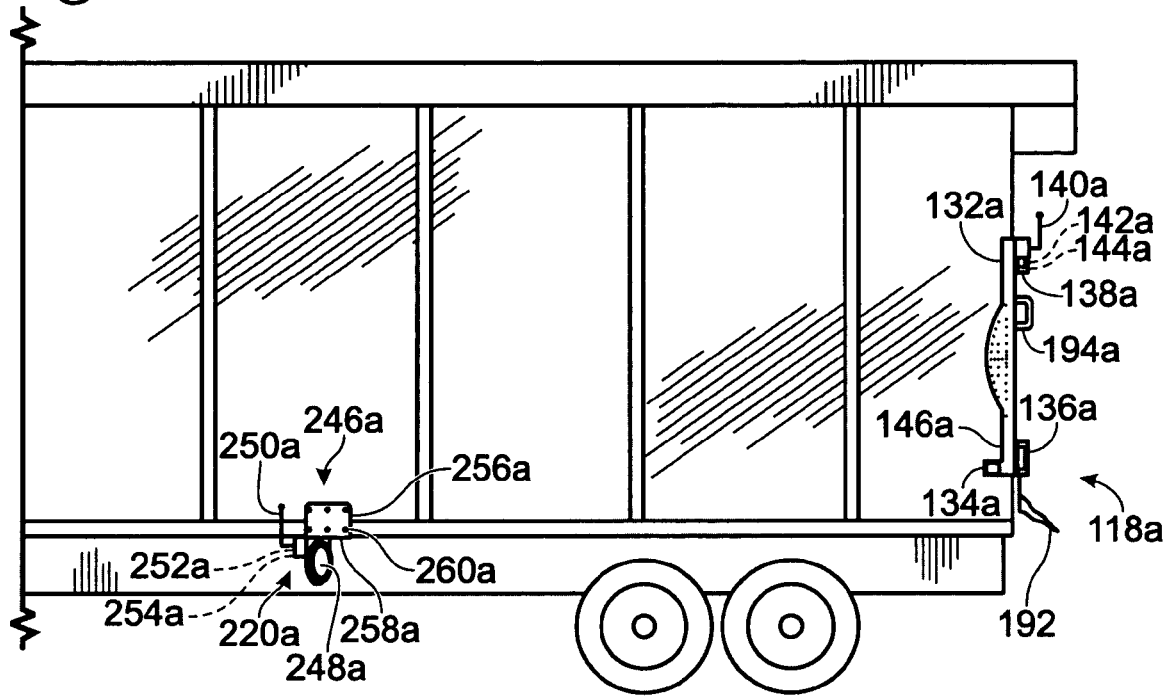
FIG. 6 shows a partial side view of a towed object with an exemplary indicator light assembly attached thereto, in accordance with the present disclosure.
Figure 7:
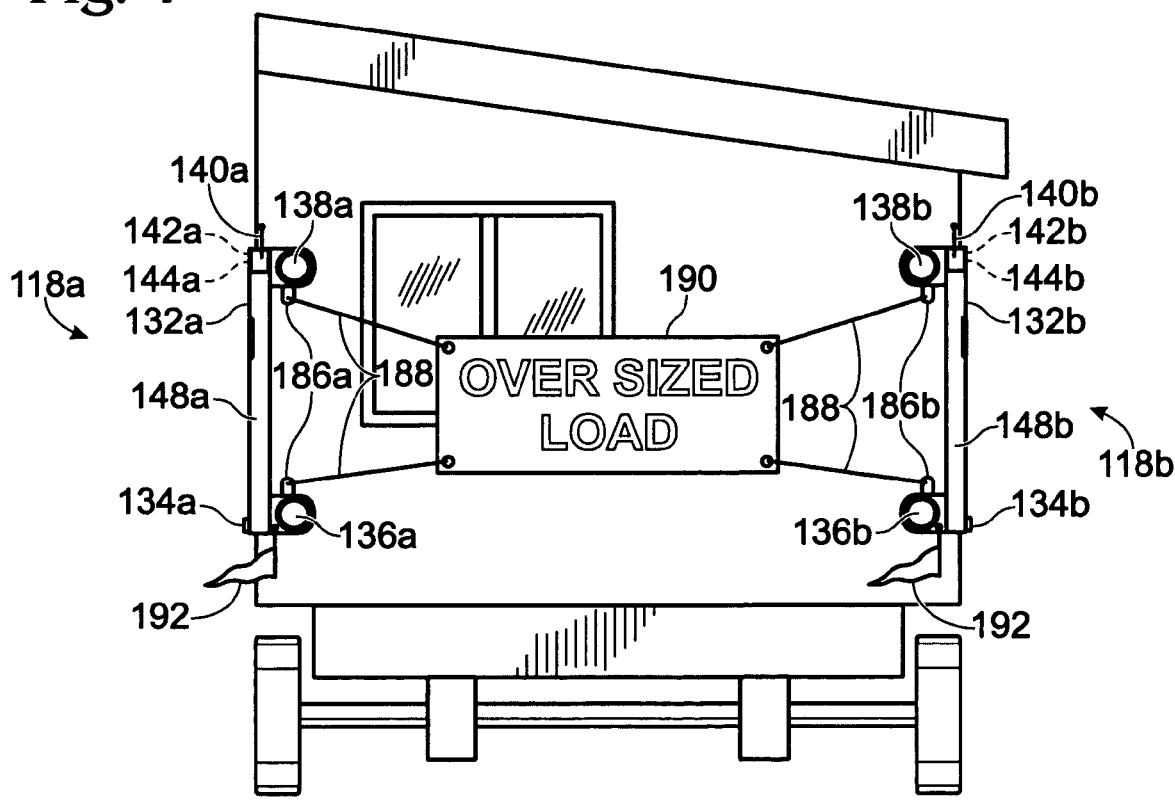
FIG. 7 shows a rear view of a towed object with the indicator light assembly of FIG. 6 attached thereto, in accordance with the present disclosure.

The left support structure 132a may be adapted to be mounted on a towed object 12 having a substantially planar rear end, a substantially planar left side orthogonal to the rear end, and a substantially vertical left-rear intersection between the left side and the end. For example, the left support structure may include a first planar portion 146a and a second planar portion 148a orthogonal to the first portion. At least one of the first and second portions of the left support structure may include a plurality of apertures 150a for receiving fasteners 152 (such as nails, screws, bolts, staples, or any other suitable fastener) having a size that corresponds to the size of the apertures. As shown in FIGS. 6-7, the left support structure may be mounted on the left-rear intersection of the towed object in a mounted position, whereby the first portion engages the left side of the towed object, the second portion engages the rear end of the towed object, and the at least one indicator light is appropriately positioned for viewing from selected positions spaced from the rear end (i.e. from positions directly behind the rear end of the towed object at various intervals, or from positions offset to the left of such positions). For example, the vertical position of the left support structure on the intersection may be selected by a user, so as to appropriately position the at least one indicator light at a selected height relative to the towed object and/or the ground. The left support structure thereafter may be secured to the towed object in the mounted position by inserting the fasteners through the apertures and into the towed object.

The right support structure 132b may be adapted to be mounted on a towed object having a substantially planar rear end, a substantially planar right side orthogonal to the rear end, and a substantially vertical right-rear intersection between the left side and the end. For example, similar to the left support structure, the right support structure may include a first planar portion 146b and a second planar portion 148b orthogonal to the first portion. At least one of the first and second portions of the right support structure may include a plurality of apertures 150b for receiving fasteners 152. As shown in FIG. 6, the right support structure may be mounted on the right-rear intersection of the towed object in a mounted position, whereby the first portion engages the right side of the towed object, the second portion engages the rear end of the towed object, and the at least one indicator light is appropriately positioned for viewing from selected positions spaced from the rear end (i.e. from positions directly behind the rear end of the towed object at various intervals, or from positions offset to the right of such positions). For example, the vertical position of the right support structure on the intersection may be selected by a user, so as to appropriately position the at least one indicator light at a selected height relative to the towed object and/or the ground. The right support structure thereafter may be secured to the towed object in the mounted position by inserting the fasteners through the apertures and into the towed object.

The left and right support structures 132a-b may be mirror images. Because the left support structure 132a may be adapted for mounting to a left rear intersection of a towed object, and the right support structure may be adapted for mounting to a right rear intersection of a towed object, the shape and configuration of the left support structure may be a mirror image of the shape and configuration of the right support structure, as shown in FIG. 2. However, it is also possible to construct custom left and right support structures that are not mirror images, and are specifically designed for use with unevenly or irregularly shaped towed objects.

The left and/or right support structures 132a-b may be elongate structures extending along longitudinal axes X, and having first ends 154a-b and second ends 156a-b, as shown in FIG. 2. The elongate support structure(s) may provide a plurality of positions along which the at least one indicator light(s) 132a-b, 134a-b, and/or 136a-b, the receiver(s) 140a-b, the controller(s) 142a-b, and/or the power suppl(ies) 144a-b may be attached. For example, for tail-light assemblies having a plurality of indicator lights, the position where each indicator light is attached to the support structure(s) may be pre-selected to ensure that each indicator light is appropriately positioned relative to the other indicator lights. More specifically, indicator lights 136a-b and/or 138a-b, which may be red lights functioning as brake lights, turn signal lights, hazard lights and/or running lights, may be attached to the support structure(s) proximal to the first ends 154a-b, while indicator lights 138a-b, which may be amber lights functioning as strobes, may be positioned proximal to the second ends 156a-b. Further, the attachment positions of the amber lights and/or red lights may be pre-selected to ensure that they are appropriately spaced from each other, and/or are mountable in appropriate positions relative to the towed object, so that the tail-light assemblies comply with applicable traffic laws, and/or are sufficiently safe for use on the roadways.

The left and/or right support structures 132a-b may be selectively attachable to one or more other components adapted to mount the support structures proximal to the rear of towed objects having different dimensions. For example, as shown in FIG. 2, the left and/or right tail-light assemblies 118a-b may include first arms 158a-b adjustably attachable to the second ends 156a-b of the support structures, and adapted to selectively couple the second ends 156a-b of the support structures to securing devices 160a-b. Alternatively or additionally, the left and/or right tail-light assemblies may include second arms 162a-b adjustably attachable to the first ends 154a-b of the support structures, and adapted to selectively couple the first ends 154a-b of the support structures to securing devices 164a-b.

The first arms 158a-b may have first ends 166a-b and second ends 168a-b, and may extend along longitudinal axes Y. The first ends 166a-b of the first arms 158a-b may be adapted to adjustably attach in a plurality of positions to the second ends 156a-b of the support structures whereby, for each discreet position, the longitudinal axis X is substantially parallel to the longitudinal axis Y, and the second ends 168a-b are spaced from the second ends 156a-b of the support structures. For example, as shown in FIG. 2, the first ends 166a-b of the first arms 158a-b may be dimensioned to slidably engage sleeves 170a-b attached to the second ends 156a-b of the support structures, and the position of the first arms 158a-b relative to the support structures may be fixed by inserting fasteners 172 (such as cotter pins, hooks, bolts, screws, or the like) through an aperture in the sleeves 170a-b and through one of a plurality of apertures in the first arms 158a-b. Alternatively or additionally, the first ends 166a-b of the first arms 158a-b may be selectively secured to any other portions of the second ends 156a-b of the support structures with one or more fasteners 168, as exemplified in FIG. 3.

The second ends 168a-b of the first arms 158a-b may be selectively or fixedly attached to the securing devices 160a-b, which may include any devices for securely engaging the towed object in a selected position. For example, as shown in FIG. 2, the securing devices 160a-b may be dimensioned to slidably engage the second ends 168a-b, and may be secured in selected positions relative to the second ends 168a-b with fasteners 168. The securing devices may also form integral components of the second ends 168a-b, as exemplified in FIG. 3. The securing devices 160a-b may include magnets for securing the second ends 168a-b to a selected metallic portion of a towed object, apertures for receiving fasteners for fastening the second ends 168a-b to a selected portion of a towed object, lashings for tying the second ends 168a-b to a selected portion of a towed object, clamps for clamping the second ends 168a-b to a selected portion of a towed object, or any other suitable securing devices. For example, the securing devices 160a-b may include hooks 174a-b that extend away from the second ends 168a-b to form a point for engaging the towed object. The hooks 174a-b may enable a user to use the tail-light assembly with towed objects having a substantially planar rear end, a substantially planar top side disposed at a transverse angle relative to the rear end, and an intersection between the top side and the rear end. For example, as shown in FIGS. 8-9, the hooks 174a-b may enable a user to hang the tail-light assemblies from the top side of the towed object by engaging the points of the hooks with a portion of the top side adjacent to the intersection.

Further, because the positions of the first arms 158a-b relative to the support structures, and/or the positions of the securing devices 160a-b relative to the second ends 168a-b, may be fully adjustable, a user may selectively adjust the distance between the second ends 156a-b of the support structures and the securing devices 160a-b. This adjustability enables a user to attach multiple tail-light assemblies in appropriate positions proximal to a towed object having a rear end with varying dimensions, or to attach the tail-light assemblies to various different towed objects that each has a different dimension. For example, as best shown in FIG. 9, left and right tail-light assemblies 118a-b may be secured to the rear end of a towed object having a substantially planar rear end, and a sloped, substantially planar top side orthogonal to the rear end. The attachment positions of the first arms 158a-b relative to the left and right support structures 132a-b may be selectively adjusted in a manner that enables a user to hang the indicator light assemblies such that the left support structures (and thus the indicator lights 134a, 136a and 138a) are positioned at substantially the same vertical height as the right support structure (and thus the indicator lights 134b, 136b, and 138b). Due to the sloped angle of the top side of the towed object, the distance between the second end 154a and securing device 160a is greater than the difference between the second end 154b and securing device 160b.

The second arms 162a-b may have first ends 176a-b and second ends 178a-b, and may extend along longitudinal axes Z. The second ends 178a-b of the second arms 162a-b may be adapted to adjustably attach in a plurality of positions to the first ends 154a-b of the support structures whereby, for each discreet position, the longitudinal axis X is substantially parallel to the longitudinal axis Z, and the second ends 178a-b are spaced from the first ends 154a-b of the support structures. For example, as shown in FIG. 2, the second ends 178a-b of the second arms 162a-b may be dimensioned to slidably engage sleeves 180a-b attached to the first ends 154a-b of the support structures, and the position of the second arms 162a-b relative to the support structures may be fixed by inserting fasteners 172 through an aperture in the sleeves 180a-b and through one of a plurality of apertures in the second arms 162a-b. Alternatively or additionally, the second ends 178a-b of the second arms 162a-b may be selectively secured to any other portions of the first ends 154a-b of the support structures with one or more fasteners 172, as exemplified in FIG. 3.

The first ends 176a-b of the second arms 162a-b may be selectively or fixedly attached to the securing devices 164a-b, which may include any devices for securely engaging the towed object in a selected position. For example, as shown in FIGS. 2-3, the securing devices 164a-b may form integral components of the first ends 176a-b. The securing devices 164a-b may include magnets for securing the first ends 176a-b to a selected metallic portion of a towed object, apertures for receiving fasteners for fastening the first ends 176a-b to a selected portion of a towed object, lashings for tying the second ends 168a-b to a selected portion of a towed object, clamps for clamping the second ends 168a-b to a selected portion of a towed object, or any other suitable securing devices. For example, as best shown in FIGS. 8-9, the securing devices 164a-b may include one or more abutments 182a-b that extend away from the first ends 176a-b for frictionally engaging the side of a towed object, and lashings 184a-b (such as wire, chains, cord, bungee cord, rope, twine, and/or the like) for securing the first ends 176a-b to a portion of the towed object. Second arms 162a-b having abutments 182a-b and lashings 184a-b may be used in conjunction with tail-light assemblies having first arms 158a-b with hooks 174a-b. Specifically, when the tail-light assemblies 118a-b are hung in a mounted position proximal to the rear of a towed object by engaging the points of the hooks 174a-b with a portion of the top side of the towed object, the abutments 182 may engage the rear end of the towed object, thereby stabilizing the tail-light assemblies, and preventing rotational movement of the tail-light assemblies about an axis defined by the points of the hooks 174a-b. The lashings 184a-b may thereafter be used to secure the first ends 176a-b of the second arms 162a-b in the mounted position. Thus, securing devices 160a-b and securing devices 164a-b may be adapted to cooperatively secure the support structures 132a-b in the mounted position.

Further, because the positions of the second arms 162a-b relative to the support structures are adjustable, a user may selectively adjust the distance between the first ends 154a-b of the support structures and the securing devices 164a-b. This adjustability enables a user to attach multiple support structures in appropriate positions proximal to a towed object having a rear end with varying dimensions, or to attach the support structures to various different towed objects that each has different dimensions, as best shown in FIG. 9. For example, the left and right tail-light assemblies 118a-b may be secured to the rear end of a towed object having a substantially planar rear end, and a sloped, substantially planar top side orthogonal to the rear end. The attachment positions of the first arms 158a-b relative to the left and right support structures 132a-b may be selectively adjusted in a manner that enables a user to hang the indicator light assemblies such that the left support structures (and thus the indicator lights 134a, 136a and 138a) are positioned at substantially the same vertical height as the right support structure (and thus the indicator lights 134b, 136b, and 138b). Due to the sloped angle of the top side of the towed object, the distance between the second end 154*a* and securing device 160*a* is greater than the difference between the second end 154*b* and securing device 160*b*.

The left and/or right support structures 132*a-b* may include additional components for securing the left and right support structures to each other, or for attaching additional safety equipment to the tail light assembly. For example, as best shown in FIG. 7, the left and right support structures may each include one or more apertures 186*a-b* (such as may formed with a U-shaped clip, a hook, a hole, and/or the like) for attaching the left support structure to the right support structure with lashings 188. The left and right support structures may either be directly attached to each other with the lashings, or may attach to an intermediate structure 190, such as an "Over Sized Load" sign, or some other intermediate structure. The lashings may function to further strengthen the manner in which the support structures are secured to the towed object by pulling the left support structure towards the right support structure. The apertures may also be used to attach safety flags 192 to the tail-light assembly.

The left and/or right support structures 132*a/b* may include handles 194*a-b* for easily carrying the assembly when it is detached from a towed object. For example, the handles 194*a-b* may form apertures that enable a user to insert their fingers therethrough so that the user may carry the tail-light assembly when it is detached from a towed object.

The left and/or right support structures 132*a-b* may have different structures than those shown in FIGS. 2-3. For example, the left and/or right support structures may each comprise multiple separate structures adapted for selective mounting anywhere proximal to the rear of a towed object (e.g. separate structures for mounting each indicator light, and/or separate structures for mounting the receiver, controller and/or power supply). The left and right tail-light assemblies 118*a-b* may also comprise a single integrated support structure for jointly mounting the indicator light(s), receiver(s), controller(s) and/or power suppl(ies) on the towed object. Such support structures may be coupled to one or more securing devices adapted to individually or cooperatively secure the support structures in a mounted position proximal to the rear of the towed object. For example, such support structure(s) may be adapted for use with towed objects having a substantially planar rear end, at least one substantially planar side (such as a sloped side, a substantially horizontal top or bottom side, or a substantially vertical side) orthogonal to, or disposed at a transverse angle relative to the end, and having intersection(s) between each side and the rear end. The support structure(s) may be adapted to engage the towed object along the intersection(s), such as by bracketing the intersection in mounted position(s), whereby a first portion of each support structure engages a substantially side of the towed object, and a second portion of each support structure engages the rear end of the towed object. The support structures may have contact surface areas that contact corresponding side or end surface areas of the towed object. These support-structure contact surface areas may be any relative configuration suitable for mounting the tail-light assembl(ies) to a towed object.

As discussed above, the left and/or right indicator light assemblies 118*a-b* may include at least one indicator light such as indicator lights 134*a-b*, 136*a-b*, and 138*a-b*. Indicator lights 134*a-b* and/or 136*a-b* may be red indicator lights adapted to function as brake lights, turn signal lights, hazard lights and/or running lights. Specifically, the controllers 142*a-b* may be adapted to energize the red indicator lights upon the reception of wireless signals corresponding to vehicular brake light signals, turn-signal light signals, hazard light signals, and/or running light signals. Indicator lights 138*a-b* may be amber lights adapted to function as strobes for use with slow vehicles, or for use with towed objects that constitute "wide loads." Specifically, the controllers 142*a-b* may be adapted to cause the amber lights to pulse on/off when the amber lights of a towing vehicle are active.

The left and right indicator light assemblies 118*a-b* may include separate controllers 142*a-b* adapted to selectively energize the at least one indicator light associated with that controller in response to wireless signals corresponding to left vehicular indicator light signals or right vehicular indicator light signals, respectively. For example, the controller 142*a* of the left indicator light assembly 118*a* may be adapted to energize the indicator light(s) of the left tail light assembly only if the wireless signal received by the receiver corresponds to a left vehicular indicator light signal. Similarly, the controller 142*b* of the right indicator light assembly 118*b* may be adapted to energize the indicator light(s) of the right tail light assembly only if the wireless signal received by the receiver corresponds to a left vehicular indicator light signal. A left vehicular indicator light signal may include an amber light signal, a brake light signal, a left turn-signal light signal, a running light signal and/or a hazard light signal. In contrast, a right vehicular indicator light signal may include an amber light signal, a brake light signal, a right turn-signal light signal, a running light signal and/or a hazard light signal. Thus, an amber light signal, a brake light signal, a running light signal and/or a hazard light signal may each be both left and right vehicular indicator light signals.

C. The Side-light Assembly

FIG. 1 shows various aspects of the at least one side-light assembly 20 of the indicator light system 10. As discussed above, a side-light assembly may comprise any component that includes a side turn-signal light, and that is adapted to (1) attach to the side of a towed object, and (2) energize the side turn-signal light in a manner corresponding to the vehicular indicator light signal. The side-light assembly may include one or more components, and have any suitable size and shape consistent with its function.

The at least one side-light assembly 20 may include a support structure 46, a side turn-signal light 48, a receiver 50, a controller 52, and/or a power supply 54. The support structure 46 may be adapted for mounting proximal to a side of the towed object 12 in at least one mounted position. Except as indicated below, these components may function in substantially the same manner as generally described above with respect to the equivalent components of the tail-light assembly.

FIGS. 4-5 show a portion of an exemplary left side-light assembly for use with towed objects of various dimensions. The left side-light assembly 220*a* may comprise a left support structure 246*a*, a left turn-signal light 248*a*, a receiver 250*a*, a controller 252*a*, and/or a power supply 254*a*. As will be appreciated from the above discussion relating to the at least one tail-light assembly, the at least one side-light assembly may further include a right side-light assembly (not shown) comprising a right support structure, a right turn-signal light, a receiver, a controller, and/or a power supply. As with the left and right tail-light assemblies, the shape and configuration of the right side-light assembly may be a mirror image of the shape and configuration of the left side-light assembly, which is discussed in detail below. Specifically, the left and right support structures may be adapted for engaging left and right sides of a towed object, respectively. However, it is also possible to construct custom left and right support structures that are not mirror images, and are specifically designed for use with unevenly shaped towed objects.

As shown in FIGS. 6 and 8, the left support structure 246a may be adapted to be mounted on a towed object 12 having a substantially planar left side orthogonal to a substantially planar bottom side, and a substantially horizontal left intersection between the left side and the bottom side. Likewise, a right support structure (not shown) may be adapted to be mounted on a towed object having a substantially planar right side orthogonal to the substantially planar bottom side, and a substantially horizontal right intersection between the left side and the bottom side. For example, the left support structure 246a may include a first planar portion 256a and a second planar portion 258a orthogonal to the first portion. At least one of the first and second portions of the left support structure may include a plurality of apertures 260a for receiving fasteners (not shown) having a size that corresponds to the size of the apertures. The left support structure may be mounted on the left intersection of the towed object in a mounted position, whereby the first portion engages the left side of the towed object, the second portion engages the bottom side of the towed object, and the at least one indicator light is appropriately positioned for viewing from selected positions spaced from the left side (i.e. from positions adjacent to the left side of the towed object, and slightly to the rear of the position where the left side-light assembly is secured to the towed object). For example, the mounted position of the left support structure along the horizontal left intersection may be selected by a user, so as to appropriately position the left turn-signal light for viewing when other left turn-signal lights are obscured by the towed object. The left support structure thereafter may be secured to the towed object in the mounted position by inserting the fasteners through the apertures and into the towed object.

The left turn-signal light 248a may be attached to the left support structure 246a in a manner that positions the left turn-signal light at an angle relative to the horizontal left intersection when the left turn-signal light assembly is mounted on the towed object. For example, the left support structure may be adapted to position the left turn-signal light beneath the bottom side of the towed object adjacent to the left intersection, and may also be adapted to orient the left turn-signal at an angle facing slightly toward both the side and rear of the towed object, so as to be viewable by traffic passing the towing vehicle and the towed object on the left. Any suitable angle relative to the horizontal left intersection may be selected, although an angle of approximately forty-five degrees has been found to be optimal.

The support structure 46 for the at least one side-light assembly 20 may have a different structure than is shown in FIGS. 4-5. Specifically, the at least one side-light assembly may include a support structure adapted for selective mounting anywhere proximal to the side of a towed object, such as directly in the middle of the side, or positioned along a horizontal, vertical, or sloped intersection between any first and second sides (such as left sides, right sides, top sides, and bottom sides) that may be disposed orthogonal to, or at a transverse angle relative to each other. For example, the support structure may be adapted to engage the towed object along the intersection(s), such as by bracketing the intersection in mounted position(s), whereby a first portion of each support structure flatly engages a substantially planar side of the towed object, and a second portion of each support structure flatly engages the substantially planar rear end of the towed object. Additionally or alternatively, the at least one side-light assembly may be coupled to one or more securing devices (not shown) adapted to individually or cooperatively secure the support structures in a mounted position proximal to the side of the towed object. For example, securing devices may include magnets for securing the support structures to a selected metallic portion of a towed object, apertures for receiving fasteners for fastening the support structure to a selected portion of a towed object, lashings for tying the support structure to a selected portion of a towed object, clamps for clamping the support structure to a selected portion of a towed object, or any other suitable securing devices.

This disclosure encompasses multiple distinct inventions with independent utility. While each of these inventions has been described in its best mode, numerous variations are contemplated. All novel and non-obvious combinations and subcombinations of the described and/or illustrated elements, features, functions, and properties should be recognized as being included within the scope of this disclosure. Applicant reserves the right to claim one or more of the inventions in any application related to this disclosure. Where the disclosure or claims recite "a," "a first," "at least one" or "another" element, or the equivalent thereof, they should be interpreted to include one or more such elements in examples including such an element, neither requiring nor excluding two or more such elements.

What is claimed is:

1. An indicator light assembly for use with an object being towed by a towing vehicle, the towed object including a substantially planar rear end, at least one substantially planar side orthogonal to the end, and a first intersection between the side and the end, the indicator light assembly comprising:
   a transmitting assembly adapted to transmit at least one wireless signal that corresponds to a vehicular indicator light signal when coupled to an indicator light energizing circuit of the vehicle; and
   at least one tail-light assembly, comprising:
      a support structure including a first planar portion and a second planar portion orthogonal to the first portion, wherein at least one of the first and second portions includes a plurality of apertures for receiving fasteners;
      an indicator light attached to the support structure;
      a receiver attached to the support structure, and adapted to receive the wireless signal; and
      a controller attached to the support structure, and adapted to process the received wireless signal, and to energize the indicator light in a manner corresponding to the vehicular indicator light signal;
      wherein the support structure is adapted to be mounted on the first intersection of the towed object in a mounted position, whereby the first portion engages the side, the second portion engages the end, and the indicator light is appropriately positioned for viewing from a selected position spaced from the rear end; and
      wherein the support structure is adapted to be secured in the mounted position by inserting the fasteners through the apertures and into the towed object.

2. The indicator light assembly of claim 1, wherein the wireless signal corresponds to a vehicular indicator light signal selected from the group consisting of an amber light signal, a brake light signal, a left turn-signal light signal, a right turn-signal light signal, a running light signal, and a hazard light signal.

3. The indicator light assembly of claim 1, wherein the wireless signal includes at least one code specific to the indicator light assembly, and wherein the controller is adapted to energize the indicator light only upon receiving the code.

4. The indicator light assembly of claim 1, where the towed object includes a substantially planar left side orthogonal to the end, a substantially vertical left intersection between the left side and the end, a substantially planar right side orthogonal to the end, and a substantially vertical right intersection between the right side and the end wherein the at least one tail-light assembly comprises:

a left tail-light assembly including a left support structure adapted to be mounted on the left intersection so as to position the indicator light of the left tail-light assembly proximal to the left intersection, wherein the controller of the left tail-light assembly is adapted to energize the indicator light of the left tail-light assembly only if the vehicular indicator light signal is a left vehicular indicator light signal; and a right tail-light assembly including a right support structure adapted to be mounted on the right intersection so as to position the indicator light of the right tail-light assembly proximal to the right intersection, wherein the controller of the right tail-light assembly is adapted to energize the indicator light of the right tail-light assembly only if the vehicular indicator light signal is a right vehicular indicator light signal.

5. The indicator light assembly of claim 4, wherein a left vehicular indicator light signal is selected from the group consisting of an amber light signal, a brake light signal, a left turn-signal light signal, a running light signal, and a hazard light signal, and wherein a right vehicular indicator light signal is selected from the group consisting of an amber light signal, a brake light signal, a right turn-signal light signal, a running light signal, and a hazard light signal.

6. The indicator light assembly of claim 4, wherein the shape and configuration of the left support structure is a mirror image of the shape and configuration of the right support structure.

7. The indicator light assembly of claim 1, wherein the support structure of the tail-light assembly includes a handle attached to the support structure, the handle including an aperture that enables a user to insert their fingers therethrough so that the user may carry the tail-light assembly when it is detached from the towed object.

8. The indicator light assembly of claim 1, wherein the indicator light is selected from the group consisting of an amber light, a brake light, a turn-signal light, and a running light.

9. The indicator light assembly of claim 1, where the towed object includes a first substantially planar side, a second substantially planar side orthogonal to the first side, and a second intersection between the first and second sides, and wherein the indicator light assembly further comprises at least one side-light assembly, including:

a side-light support structure having at least a third substantially planar portion and a fourth substantially planar portion orthogonal to the third portion, wherein at least one of the third and fourth portions includes a plurality of apertures for receiving fasteners;

a side-light attached to the side-light support structure;

a side-light receiver attached to the side-light support structure, and adapted to receive the wireless signal; and a side-light controller attached to the side-light support structure, and adapted to process the received wireless signal, to determine whether the wireless signal corresponds to a specific vehicular turn-signal light signal, and to energize the side-light if the wireless signal corresponds to the specific vehicular turn-signal light signal;

wherein the side-light support structure is adapted to be mounted on the second intersection in a second mounted position, whereby the third portion engages the first side, the fourth portion engages the second side, and the indicator light is appropriately positioned for viewing from a selected position spaced from the first side; and wherein the side-light support structure is adapted to be secured in the second mounted position by inserting the fasteners through the apertures and into the towed object.

10. The indicator light assembly of claim 9, where the towed object includes a substantially planar left side orthogonal to a substantially planar bottom side, a substantially horizontal left intersection between the left side and the bottom side, a substantially planar right side orthogonal to the bottom side, and a substantially horizontal right intersection between the right side and the end, and wherein the at least one side-light assembly comprises:

a left side-light assembly including a left turn-signal light, and a left side-light support structure adapted to be mounted on the left intersection so as to position the indicator light of the left side-light assembly proximal to the left side, wherein the controller of the left side-light light assembly is adapted to energize the left turn-signal light only if the vehicular indicator light signal is a left vehicular turn-signal signal; and a right side-light assembly including a right turn-signal light, and a right side-light support structure adapted to be mounted on the right intersection so as to position the indicator light of the right side-light assembly proximal to the right side, wherein the controller of the right side-light assembly is adapted to energize the right turn-signal light only if the vehicular indicator light signal is a right vehicular turn-signal signal.

11. An indicator light assembly for use with an object being towed by a towing vehicle, the towed object including a rear end, the indicator light assembly comprising:

a transmitting assembly adapted to transmit at least one wireless signal corresponding to a vehicular indicator light signal when coupled to an indicator light energizing circuit of the vehicle; and at least one tail-light assembly, comprising:

a support structure extending along a first longitudinal axis, and having first and second ends;

an indicator light attached to the support structure;

a receiver attached to the support structure, and adapted to receive the wireless signal;

a controller attached to the support structure, and adapted to process the received wireless signal, and to energize the indicator light in a manner corresponding to the vehicular indicator light signal;

a first arm extending along a second longitudinal axis, and having first and second ends, wherein the first end of the first arm is adapted to selectively attach in a plurality of positions to the second end of the support structure whereby, for each discrete position, the first longitudinal axis is substantially parallel to the second longitudinal axis, and the second end of the arm is spaced from the second end of the support structure;

a first securing device coupled to the first end of the support structure; and a second securing device coupled to the second end of the first arm;

wherein the distance between the first securing device and the second end of the support structure can be selectively adjusted by changing the attachment position of the arm relative to the support structure;

wherein the first and second securing devices each are adapted to selectively engage portions of the towed object, and cooperatively are adapted to secure the support structure in a mounted position proximal to the rear end of the towed object, whereby the indicator light is appropriately positioned for viewing from a selected position spaced from the rear end.

12. The indicator light assembly of claim 11, wherein the wireless signal includes at least one code specific to the indicator light assembly, and wherein the controller is adapted to energize the indicator light only upon receiving the code.

13. The indicator light assembly of claim 11, where the rear end of the towed object is substantially planar, and where the towed object further includes a substantially planar top side disposed at a transverse angle relative to the rear end, and an intersection between the top side and the rear end, wherein the second securing device includes a hook extending away from the second end of the first arm to form a point, and wherein the first arm and the support structure are adapted to hang from the top side in a mounted position proximal to the rear end when the point is engaged with a portion of the top side adjacent to the intersection.

14. The indicator light assembly of claim 11, wherein:
the at least one tail-light assembly further includes a second arm extending along a third longitudinal axis, and having first and second ends, the second end of the second arm being adapted to selectively attach in a plurality of position to the first end of the support structure whereby, for each discrete position, the third longitudinal axis is substantially parallel to the first longitudinal axis, and the first end of the second arm is spaced from the first end of the support structure;
the first securing device is coupled to the first end of the second arm; and
the distance between the first securing device and the first end of the support structure can be selectively adjusted by changing the attachment position of the arm relative to the support structure.

15. The indicator light assembly of claim 1, wherein the at least one tail-light assembly comprises:
a left tail-light assembly, the controller of the left tail-light assembly being adapted to energize the indicator light of the left tail-light assembly only if the vehicular indicator light signal is a left vehicular indicator light signal; and
a right tail-light assembly, the controller of the right tail-light assembly being adapted to energize the indicator light of the right tail-light assembly only if the vehicular indicator light signal is a right vehicular indicator light signal.

16. The indicator light assembly of claim 15, wherein a left vehicular indicator light signal is selected from the group consisting of an amber light signal, a brake light signal, a left turn-signal light signal, a running light signal, and a hazard light signal, and wherein a right vehicular indicator light signal is selected from the group consisting of an amber light signal, a brake light signal, a right turn-signal light signal, a running light signal, and a hazard light signal.

17. The indicator light assembly of claim 11, wherein the support structure of the tail-light assembly includes a handle attached to the support structure, the handle including an aperture that enables a user to insert their fingers therethrough so that the user may carry the tail-light assembly when it is detached from the towed object.

18. The indicator light assembly of claim 11, wherein the indicator light is selected from the group consisting of an amber light, a brake light, a turn-signal light, and a running light.

19. The indicator light assembly of claim 11, where the towed object includes a first substantially planar side, a second substantially planar side orthogonal to the first side, and an intersection between the first and second sides, and wherein the indicator light assembly further comprises at least one side-light assembly, including:
a side-light support structure having at least a first substantially planar portion and a second substantially planar portion orthogonal to the first portion, wherein at least one of the first and second portions includes a plurality of apertures for receiving fasteners;
a side-light attached to the side-light support structure;
a side-light receiver attached to the side-light support structure, and adapted to receive the wireless signal; and
a side-light controller attached to the side-light support structure, and adapted to process the received wireless signal, to determine whether the wireless signal corresponds to a specific vehicular turn-signal light signal, and to energize the side-light if the wireless signal corresponds to the specific vehicular turn-signal light signal;
wherein the side-light support structure is adapted to be mounted on the first intersection in a second mounted position, whereby the first portion engages the first side, the second portion engages the second side, and the indicator light is appropriately positioned for viewing from a selected position spaced from the first side; and
wherein the side-light support structure is adapted to be secured in the second mounted position by inserting the fasteners through the apertures and into the towed object.

20. The indicator light assembly of claim 19, where the towed object includes a substantially planar left side orthogonal to a substantially planar bottom side, a substantially horizontal left intersection between the left side and the bottom side, a substantially planar right side orthogonal to the bottom side, and a substantially horizontal right intersection between the right side and the end, and wherein the at least one side-light assembly comprises:
a left side-light assembly including a left turn-signal light, and a left side-light support structure adapted to be mounted on the left intersection so as to position the indicator light of the left side-light assembly proximal to the left side, wherein the controller of the left side-light assembly is adapted to energize the left turn-signal light only if the vehicular indicator light signal is a left vehicular turn-signal signal; and
a right side-light assembly including a right turn-signal light, and a right side-light support structure adapted to be mounted on the right intersection so as to position the indicator light of the right side-light assembly proximal to the right side, wherein the controller of the right side-light assembly is adapted to energize the right turn-signal light only if the vehicular indicator light signal is a right vehicular turn-signal signal.

* * * * *